United States Patent [19]

Finch et al.

[11] Patent Number: 4,571,269

[45] Date of Patent: Feb. 18, 1986

[54] ASPHALT COMPOSITIONS

[75] Inventors: Jack N. Finch; Janice S. Sprague, both of Bartlesville, Okla.

[73] Assignee: Phillips Petroleum Company, Bartlesville, Okla.

[21] Appl. No.: 249,546

[22] Filed: Mar. 31, 1981

[51] Int. Cl.$^4$ .............................................. C08L 95/00
[52] U.S. Cl. ............................... 106/273 R; 106/277; 208/44; 252/311.5
[58] Field of Search ............... 106/278, 273, 274, 277; 208/44; 252/311.5

[56] References Cited

U.S. PATENT DOCUMENTS

| | | | |
|---|---|---|---|
| 2,909,563 | 10/1959 | Whitney | 260/504 |
| 3,322,706 | 5/1967 | McAninch | 260/28.5 |
| 3,542,680 | 11/1970 | LeSuer | 252/57 |
| 3,615,796 | 10/1971 | Schreuders | 106/283 |
| 3,658,703 | 4/1972 | VanPool | 208/251 |
| 3,939,004 | 2/1976 | Corbett | 106/273 R |
| 3,956,001 | 5/1976 | Pitchford | 106/274 |

*Primary Examiner*—Paul Lieberman
*Assistant Examiner*—Amelia B. Yarbrough
*Attorney, Agent, or Firm*—Howard D. Doescher

[57] ABSTRACT

Addition of selected dispersants comprising metal petroleum sulfurates and selected oil-soluble esters to asphaltic fractions exhibiting a positive Oliensis spot test to improve the properties thereof so that the asphaltic material will pass the Oliensis spot test and be suitable for use in paving formulations.

12 Claims, No Drawings

ASPHALT COMPOSITIONS

This invention relates to the preparation of asphaltic compositions useful for making paving formulations. In another aspect, this invention relates to the preparation of asphaltic compositions that will pass the Oliensis spot test. In accordance with another aspect, this invention relates to the use of selected dispersants for addition to asphaltic compositions that will not pass the Oliensis spot test but are made to pass the Oliensis spot test by the addition of the dispersants. In accordance with a further aspect, this invention relates to the addition of dispersants, such as metal petroleum sulfonates or oil-soluble esters, to tar sands extract which will permit the sands extract to pass the Oliensis spot test.

The Oliensis spot test (AASHO Test Designation T-102) is widely used to determine the state of homogeneity of asphaltic materials. It is well known that certain asphalt fractions cannot be used for formulation of paving binders because of their inhomogeneity as reflected by a positive response to the Oliensis spot test. Such fractions are called positive spot asphalt fractions and have usually been diverted into relatively uneconomical uses such as for fuel.

Accordingly, an object of this invention is to provide methods of treating asphaltic materials so that these materials will respond negatively to an Oliensis spot test.

Another object of this invention is to provide dispersants that will increase the homogeneity and improve the properties of asphaltic materials so that these will respond negatively to an Oliensis spot test.

Another object of this invention is to provide an economical procedure for upgrading asphaltic materials which will respond negatively to an Oliensis spot test.

Other objects, aspects, as well as the several advantages of the invention will be apparent from the following description and appended claims.

In accordance with the invention, asphaltic compositions which possess suitable properties to pass the Oliensis spot test and suitable for use in a paving formulation can be made by incorporation of a small, but effective, amount of a dispersant additive selected from at least one of (a) a metal petroleum sulfonate, and (b) an oil-soluble ester of a substantially saturated mono- or polycarboxylic acid or anhydride thereof and a hydroxyaromatic compound.

It has been found that the addition of selected dispersants as set forth above to asphaltic materials that will not pass the Oliensis spot test increases the homogeneity and improves other properties of the asphalt so that they react negatively to Oliensis spot testing. In this way, the value of many asphaltic materials can be substantially increased and their usefulness expanded.

In a specific embodiment, the addition of dispersants comprising at least one of (a) a metal petroleum sulfonate and (b) an oil-soluble ester as defined herein to a tar sands extract will permit the sands extract to pass the Oliensis spot test. This improvement is applicable for unfiltered tar sands extract (high ash bitumen) as well as filtered tar sands extract (low ash bitumen).

The positive spot asphaltic compositions used in this invention can be any bituminous material, including virgin, straight run, or reduced asphaltic fractions that will not pass the Oliensis spot test. Representative examples of asphalts which, by themselves give positive Oliensis spot tests, can be rendered negative using the instant dispersant include: Edna tar sands, Athabasca tar sand distillation residues, Sunnyside and Vernal, Utah bitumens, and other asphaltic materials.

Metal petroleum sulfonate dispersants that can be used according to the invention to improve the homogeneity and other properties of positive spot asphalt in compositions are well known in the art as disclosed in U.S. Pat. No. 2,909,563, which is incorporated herein by reference. Overbased metal petroleum sulfonates, such as disclosed in U.S. Pat. No. 3,658,703, can also be used. This reference is also hereby incorporated by reference. A presently preferred metal petroleum sulfonate is calcium petroleum sulfonate.

Generally the metal petroleum sulfonate dispersants are prepared by sulfonating a highly refined, high molecular weight petroleum fraction with liquid $SO_3$ dissolved in an inorganic solvent, neutralizing the reaction mixture with the carbonate, oxide or hydroxide of a metal. Calcium, potassium or sodium can be used for the metal in the sulfonate.

Another suitable dispersant for improving the properties of oil-soluble esters of a substantially saturated mono- or polycarboxylic acid or anhydride thereof and a hydroxyaromatic compound. More specifically, such compounds contain monoesters, diesters, and mixtures thereof, prepared from polyisobutenyl-substituted succinic acid or anhydride, and monohydroxy or polyhydroxy phenols as disclosed in U.S. Pat. No. 3,542,680, which is hereby incorporated by reference.

The amounts of the inventive dispersants which are added to the asphaltic material in order to produce a negative reaction to the spot test are subject to wide variation. Some of the additives are more effective in this respect than others. In general, the amounts of dispersant incorporated into the asphaltic material being treated will be a small, finite, but effective amount sufficient to form an asphaltic product that will pass the Oliensis spot test negatively. The amounts of metal petroleum sulfonate dispersant used will range from about 1.5–10 weight percent whereas the amounts of the oil-soluble esters will range from about 1.5–2.5 wt. %.

No special conditions are required for blending the dispersant additives with the positive spot asphaltic material being treated. The dispersant additive materials can be incorporated directly with mixing into the positive spot asphaltic material or along with a solvent and mixed under suitable conditions over a sufficient period of time to intimately incorporate dispersants into the asphaltic material. If desired, the positive spot asphalt can be heated, preferably to a temperature which is below the point at which cracking of the asphalt or decomposition of the additive will occur. In the case of the dispersant additives of the present invention, a temperature of around 100°–200° F. can generally be safely used.

In one presently preferred embodiment of the invention, Edna tar sands extract, which exhibits a positive test when subjected to oliensis spot testing, will pass the oliensis spot test by addition of the instant dispersants. The Edna tar sands extract is obtained using a hydrocarbon solvent extracting the bitumen from the tar sands. The solvent used generally is a full-range reformate containing about 40% aromatics. The process of obtaining the extract comprises the following steps:

(1) The mined tar sand is fed to a pulper for size classification.

(2) Sands are hot water washed to remove impurities, and to be water wet.

(3) The wet sands are mixed with the reformate at 140°-150° F.

(4) The mixture of the reformate and sands is charged into a mixing/settling column separator along with internal recycle water to yield the oil phase and the sand tailing phase.

(5) Separate the remaining particulate matter from the reformate/bitumen phase by centrifugal action.

(6) Strip the reformate/bitumen phase to yield an overhead reformate for recycle and tar sand bitumen extract as the bottom product.

The properties of the Edna tar sands bitumen obtained as described above, are as follows:

TABLE 1

| Properties | |
| --- | --- |
| API Gravity, 60° F. | 7.6 |
| Specific Gravity, 60/60° F. | 1.0173 |
| Pour Point, F | +55 |
| Viscosity, Centistokes | |
| 100° F. | 3390 |
| 122° F. | — |
| 140° F. | 1366.9 |
| 180° F. | 314.78 |
| 210° F. | 126.87 |
| Carbon Residue, Rams., Wt. % | 12.09 |
| Elemental Analysis, Wt. % | |
| Carbon | 82.95 |
| Hydrogen | 10.15 |
| Oxygen | 1.31 |
| Nitrogen | 0.84 |
| Sulfur | 3.90 |
| Trace Metals, ppm | |
| Nickel | 131.0 |
| Vanadium | 60.9 |
| Iron | 2.7 |
| Ash Content, Wt. % | 0.71 |

The negative spot asphaltic materials of the invention containing the dispersant additives described herein can be mixed with other asphalt such as rock asphalt, lake asphalt, petroleum derived asphalt, and the like, and/or bituminous materials for use in paving formulation or other applications as desired.

SPECIFIC EXAMPLE

A typical preparation of passable asphalt as determined by oliensis spot test, such as Run 3 was made by blending 98.1 wt. % of the toluene extracted bitumen from Edna tar sands with 1.9 wt. % of a calcium petroleum sulfonate diluted in Stoddard solvent such as the commercially available kerosene used in the spot test. The method of spot test is AASHO (American Association of State Highway Officials) Designation T-102-74. Due to limited bitumen availability, tests were done on one-tenth scale at 15 minute intervals. Additional data varying dispersant concentrations are set forth in the following table.

The Edna tar sands extract and the properties approximating those are set forth in the specification in Table 1.

The calcium petroleum sulfonate was prepared by sulfonating 250 lube oil stock with $SO_3$ to yield high molecular weight sulfonic acids which are then neutralized with lime as set forth in U.S. Pat. No. 2,909,563. As demonstrated by the following runs, the calcium petroleum sulfonate in the range of about 2-5 weight percent yields passable asphalts on oliensis spot tests for both filtered and unfiltered bitumen extracts.

The oil-soluble ester used in Runs 6-9 contains monoesters and diesters and mixtures thereof as disclosed in U.S. Pat. No. 3,542,680. This material is prepared from polyisobutylenyl-substituted succinic acid or its anhydride and monohydroxy or polyhydroxy phenols. The oil-soluble ester will give passable asphalt on Oliensis spot tests, both filtered and unfiltered bitumen extracts at about 2 wt. %.

The results of the above runs are set forth in Table 2.

TABLE 2

| Run | Unfiltered Extract | | Filtered Extract | |
| --- | --- | --- | --- | --- |
| 1[a] | 0% | Fail | 0% | Fail |
| 2[a] | 1.05% | Fail | 1.05% | Fail |
| 3[a] | 1.90% | Pass | 1.91% | Pass |
| 4[a] | 3.11% | Pass | 3.09% | Pass |
| 5[a] | 5.22% | Pass | 5.21% | Pass |
| 6[b] | 1.01% | Fail | 1.02% | Fail |
| 7[b] | 1.84% | Pass | 1.86% | Pass |
| 8[b] | 2.87% | Fail | 2.89% | Fail |
| 9[b] | 5.60% | Fail | 5.62% | Fail |

[a]Calcium Petroleum Sulfonate
[b]Oil-Soluble Esters

Table 2 indicates that the calcium petroleum sulfonate in Runs 3-5 and the oil-soluble ester in Run 7 produce a tar sand extract that will pass the Oliensis spot test. In this manner, the value of the tar sand extract is substantially increased and its usefulness expanded.

We claim:

1. An asphaltic composition which exhibits a negative test when subjected to Oliensis spot testing which consists of a mixture of:
    (a) a bitumen or bituminous material that will not pass the Oliensis spot test by itself containing a small but effective amount sufficient to give passable bituminous material on Oliensis spot test of
    (b) a calcium petroleum sulfonate in an effective amount in the range of about 2-5 weight percent.
2. A composition according to claim 1 wherein said bituminous material is a tar sands extract.
3. A composition according to claim 2 wherein said tar sands extract is characterized by the following properties;

| API Gravity, 60° F. | 7.6 |
| --- | --- |
| Specific Gravity, 60/60° F. | 1.0173 |
| Pour Point, F | +55. |

4. A method for improving the response of bituminous materials which exhibit a positive test when subjected to Oliensis spot testing which comprises adding to
    (a) a bitumen or bituminous material that will not pass the Oliensis spot test by itself a small but effective amount sufficient to give passable bituminous material on Oliensis spot test at least one of
    (b) a calcium petroleum sulfonate in an effective amount in the range of about 2-5 weight percent, or
    (c) at least one oil-soluble ester of a substantially saturated mono- or polycarboxylic acid or anhydride thereof, and a hydroxyaromatic compound in an effective amount in the range of about 1.5 to about 2.5 weight percent thereby producing a bituminous material exhibiting a negative Oliensis spot test.
5. A method according to claim 4 wherein heating to about 150° F. and stirring are employed for addition of (a), (b) or (c).

6. A method according to claim 4 in which the bituminous material is a tar sands extract characterized by the properties set forth in claim 3.

7. A method according to claim 6 wherein (c) is added to said tar sands and (c) comprises a mixture of monoesters or diesters prepared from polyisobutenyl-substituted succinic acid, its anhydride and monohydroxy or polyhydroxy phenols.

8. An asphaltic composition which exhibits a negative test when subjected to Oliensis spot testing which comprises a mixture of:
   (a) a bitumen or bituminous material that will not pass the Oliensis spot test by itself, and
   (b) a small but effective amount in the range of about 1.5 to about 2.5 weight percent sufficient to give passable bituminous material on Oliensis spot test at least one oil-soluble ester of a substantially saturated mono- or polycarboxylic acid or anhydride thereof, and a hydroxyaromatic compound.

9. A composition according to claim 8 wherein said bituminous material is a tar sands extract.

10. A composition according to claim 9 wherein said tar sands extract is characterized by the following properties;

| API Gravity, 60° F. | 7.6 |
| Specific Gravity, 60/60° F. | 1.0173 |
| Pour Point, F | +55. |

11. A composition according to claim 8 wherein said oil-soluble ester comprises a mixture of monoesters or diesters prepared from polyisobutenyl-substituted succinic acid, its anhydride and monohydroxy or polyhydroxy phenols.

12. A composition according to claim 10 wherein (b) is an oil-soluble ester comprising a mixture of monoesters or diesters prepared from polyisobutenyl-substituted succinic acid, its anhydride and monohydroxy or polyhydroxy phenols.

* * * * *